Oct. 3, 1967  F. P. KANIA ETAL  3,345,186
METHOD OF MAKING A DEHYDRATED CONFECTION
Filed Oct. 15, 1964
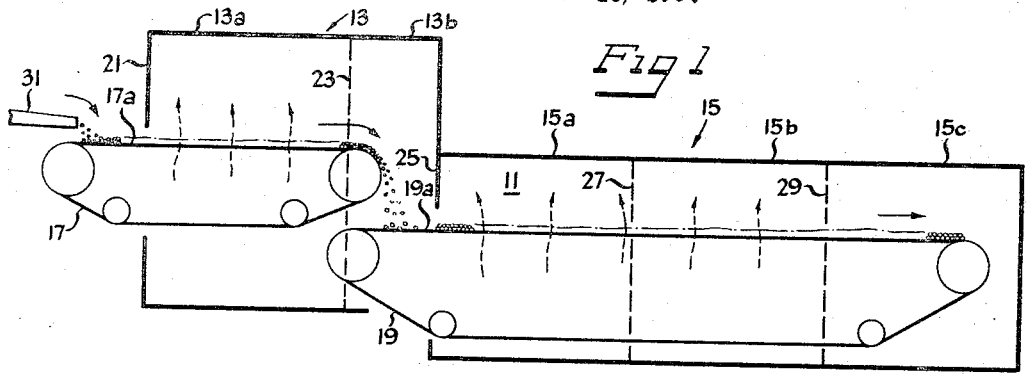
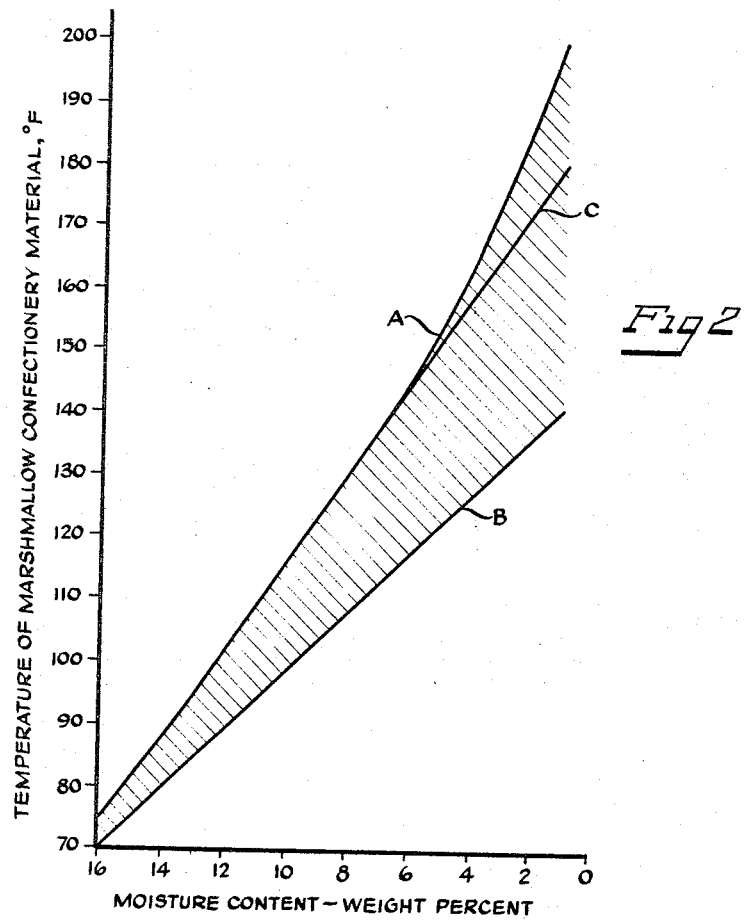
INVENTORS
FRANK P. KANIA
EDWARD S. OLNEY
By Anderson, Luedeka, Fitch, Even & Tabin
Atty's United States Patent Office 3,345,186
Patented Oct. 3, 1967

3,345,186
METHOD OF MAKING A DEHYDRATED CONFECTION
Frank P. Kania, Chicago, and Edward S. Olney, Deerfield, Ill., assignors to National Dairy Products Corporation, New York, N.Y., a corporation of Delaware
Filed Oct. 15, 1964, Ser. No. 404,126
4 Claims. (Cl. 99—199)

ABSTRACT OF THE DISCLOSURE

A marshmallow-like material produced by either an extrusion process or a starch casting process, is dried under particular conditions of time and temperature so as to reduce the moisture content to less than about 12 percent. The drying is effected under such conditions as to maintain the marshmallow-like material at temperatures and moisture contents within the shaded area of FIGURE 2 of the application.

---

The present invention relates generally to confectionery products. More particularly, it relates to marshmallow products.

Marshmallow products may be made either by the traditional starch casting process, or by the more recently developed extrusion process. In accordance with the starch casting process, sugars are dissolved in water and cooked to provide a syrup, to which gelatin is added. The syrup, usually comprising not less than about 25 percent moisture, is then agitated to effect aeration of the syrup. The aerated syrup is then cast in molds formed from dry starch, to form a marshmallow in which molds moisture is absorbed from the marshmallow by the starch to result in a tender finished marshmallow having a desired moisture content and which will not stick. In general, the moisture content of cast marshmallows is about 17 percent by weight. A moisture content significantly above about 17 percent can result in stickiness and is not desired. Low moisture contents are not readily obtained by the casting process, inasmuch as an equilibrium between the marshmallow and the starch is reached at which point additional moisture is not readily absorbed by the starch without again drying the starch.

In accordance with the extrusion process, a syrup is also prepared by cooking a solution of sugars, to which gelatin is also added. However, the moisture content of the cooked syrup is controlled to provide only a very slightly higher moisture content, e.g. about 19–20 percent, than is desired in the finished marshmallow. Much lower moistures become difficult to handle and aerate. The syrup is aerated, and is thereafter extruded, dusted with a moisture-absorbent material such as starch, sugar, cocoa, or mixtures thereof, and cut into marshmallows. Such a process is set forth in United States Letters Patent No. 2,847,311, and provides a marshmallow which has a moisture content of about 15–18 percent.

Thus, the moisture content of marshmallows, whether made by the casting process or the extrusion process, has been about 17 percent, primarily because of inherent limitations on the minimum moisture level obtainable in either process. While such marshmallows are standard and have acceptable keeping quality and lack of stickiness, if packaged in moisture-resistant materials, it is desirable in some instances to provide a marshmallow product having substantially lower moisture levels than those heretofore provided. Either cast or extruded marshmallows, if allowed to remain at ambient temperatures and humidities, continue to lose moisture, but in an uncontrolled manner. As a result, after a period of exposure to air, marshmallows develop an undesirably wrinkled and shriveled surface, and also tend to acquire an undesirably tough or hard body.

Furthermore, if either cast or extruded marshmallows are mixed with another food product having a lower moisture content than the marshmallow, migration of moisture from the marshmallow to the other food product may occur, resulting in adverse effects upon both the marshmallow and the other food product. Thus, it would be desirable to provide a marshmallow product having a moisture content lower than that of marshmallows, and whose moisture content could be preselected to be compatible with various temperature-humidity environments.

It is an object of the present invention to provide a marshmallow product having a preselected low moisture content. It is a further object of the present invention to provide a marshmallow confectionery product having a preselected moisture content of less than about 12 percent by weight. It is a still further object of the present invention to provide a method for reducing the moisture content of marshmallow confectionery materials to a preselected low level. It is an additional object of the present invention to provide a method whereby marshmallow confectionery materials may be extruded and thereafter may be dried to a preselected low moisture content. Another object of the present invention is to provide a method of extruding and drying a marshmallow product to provide a moisture content therein of less than about 12 percent. Other objects and advantages of the present invention will become apparent from the following description and drawings, in which:

FIGURE 1 is a schematic view of apparatus suitable for the practice of the present invention; and FIGURE 2 is a graph depicting the relationship of the temperature of a marshmallow product to the moisture content of the marshmallow product.

The product and method of the present invention are particularly adaptable to the extrusion marshmallow process described above. In this connection, while cast marshmallows could be treated in accordance with the present invention to reduce their moisture content, such marshmallow confectionery materials would first have to be cast in starch molds, removed from the molds, and thereafter further treated in accordance with the present invention. This would involve steps which are entirely avoided in the extrusion process, namely, that of casting, molding, and removing the marshmallows ffrom the starch molds. Accordingly, from an economic standpoint, the extrusion process is preferred, and the product and process of the present invention will hereinafter be described with particular reference to the extrusion process.

Generally, in accordance with the present invention, a marshmallow-type syrup is prepared, cooked, and cooled to the desired aeration temperature. The syrup is then agitated with controlled addition of nitrogen or other innocuous gas to provide the desired overrun. Thereupon, the aerated marshmallow syrup is extruded through dies having the desired marshmallow product configuration, to provide a continuous strand. The surface of the strand is dusted with starch, sugar, cocoa or mixtures thereof, and is thereafter cut into appropirate lengths. All of this is generally in accordance with the processing procedures set forth in United States Letters Patent No. 2,847,311.

The resultant cut marshmallow product, hereinafter sometimes referred to as "marshmallow confectionery material," "marshmallow confectionery slices" or simply "slices," are thereafter dried in a stream of heated gas whose temperature is controlled to maintain the slices at particular temperatures which are functionally related to the changing moisture content of the slices. The slices are maintained under such conditions of drying and temperature until their moisture content has been reduced to a preselected level, which is below about 12 percent by weight of the slices.

More particularly, and with reference first to the preferred marshmallow syrup, aeration, and extrusion thereof, the marshmallow slices, at some time prior to completion of the drying process, should acquire a grained texture. Accordingly, the composition of the marshmallow syrup preferably is chosen so as to promote crystallization of sugars in the slices, such crystals being the "grains" present in a grained marshmallow material. The manner in which sugar crystallization and resultant graining may be obtained is known to those skilled in the art. For example, a high proportion of sucrose may be utilized in the marshmallow syrup, and after cooking of the syrup and after cooling to the desired aeration temperature a small amount of sugar crystals may be added to the syrup as "seed" for further crystal growth. The particular proportions of sucrose required to effect such grained texture will vary, depending upon the particular formulation and processing conditions which are utilized, but the provision of such grained texture is known to those skilled in the art.

Now considering FIGURE 1 of the drawing, the extruded and cut slices are conducted to a drying apparatus 11. The drying apparatus 11 comprises a first stage 13 and a second stage 15. The first stage 13 includes a first drying section 13a and a transfer section 13b, while the second stage 15 includes a second drying section 15a, a third drying section 15b, and a cooling section 15c.

An endless stainless steel perforated plate conveyor 17 extends through the first drying section 13a of the first stage 13 of the drying apparatus 11, and is driven so that its upper run 17a moves in the direction indicated by the arrow.

A second endless stainless steel perforated plate conveyor 19 extends from the transfer section 13b of the first stage 13 to the cooling section 15c of the second stage 15. It is driven so that its upper run 19a also moves in the direction indicated by the arrow.

In the first drying section 13a, as well as in the second and third drying sections 15a and 15b, respectively, a stream of heated air is caused to flow vertically through the upper runs 17a and 19a of conveyers 17 and 19. The direction of flow of such heated air is indicated in FIGURE 1 by broken arrows, although other flow paths may also be utilized. Because the conveyers 17 and 19 are of a perforated construction, the heated air passes through the conveyer and past the slices disposed thereon. The temperature of the drying air in each drying section is separately controlled, and curtains 21, 23, 25, 27, and 29 substantially isolate the drying air in each drying section from adjacent temperature conditions.

A feed device 31 for depositing undried slices is disposed adjacent the upper run 17a of the conveyer 17, and includes appropriate means to effect controlled distribution of slices on the upper run 17a. The slices are conducted from the feed device 31 onto conveyer 17, which transports them through the first drying section 13a, and into the transfer section 13b, from which they are transferred by gravity to the upper run 19a of conveyer belt 19.

The marshmallow slices are then conveyed through the second and third drying sections 15a and 15b on the upper run 19a of conveyer 19, into the cooling section 15c. In the cooling section 15c, a stream of unheated air is continuously passed vertically through the conveyer and past the slices to reduce their temperature to the desired packaging temperature. The marshmallow confectionery slices are then discharged from the conveyer 19, from which they are transported to appropriate packaging equipment (not illustrated) for packing into suitable containers.

It is important, in the practice of the present invention, that the marshmallow confectionery material be maintained at a particular temperature during the drying steps, which temperature is functionally related to the changing moisture content of the slices. In this connection, in FIGURE 2 of the drawing there is plotted temperature of the marshmallow confectionery material, in ° F., as a function of the moisture content of the material, expressed as weight percent of the moist material. The upper curve of FIGURE 2, identified as curve A, represents the maximum temperature to which the marshmallow product should be exposed at a given moisture content. If the temperatures of curve A are exceeded for significant periods of time, the marshmallow product will tend to deform from its intended shape and the slices will tend to cohere, both of which are undesired. The lowermost curve, identified as curve B, represents the minimum temperature at which the marshmallow confectionery material should be dried. If drying is effected at temperatures less than those of curve B, the drying rate becomes uneconomical, and undesired distortion may also result.

Between curves A and B of FIGURE 2, there is a shaded region on the graph representing the drying conditions which provide the benefits of the present invention. It will be seen that the shaded portion extends from a moisture content of about 16 percent to about 1 percent, based on the weight of the moist marshmallow confectionery material and covers temperature ranges of 140° F. to 200° F. at the lower moisture content and 70° F. to 75° F. at the higher moisture content. In accordance with the present invention, to obtain a preselected moisture content in a marshmallow confectionery material having an initial moisture content of 16 percent or more, drying to such preselected content should be conducted under the conditions set forth in this shaded portion.

In the practice of the present invention, the marshmallow confectionery material should be subjected to the drying conditions of FIGURE 2 within about 6 hours after extrusion thereof. Even if such extruded material is maintained at temperatures between 70° F. and 75° F. after extrusion, undesired surface effects may result, if it is not dried to a preselected moisture content within about 6 hours.

*Example I*

As a specific example of the practice of the present invention, a marshmallow syrup was prepared by metering 90 pounds of water into a 400-gallon kettle equipped with a steam jacket and an agitator. To the water was added 650 pounds of granulated sugar (sucrose) and 100 pounds of dextrose. Steam was then introduced into the kettle jacket, and the temperature of the contents of the kettle was raised to about 244° F., with agitation. Thereupon, about 80 pounds of corn syrup (63 DE) was added. One-half pound of sodium hexametaphosphate was also added, and the resultant mixture was cooled to about 170° F.

In a separate container, 22 pounds of gelatin (30 Bloom) was dissolved in 50 pounds of water which had been heated to 170° F. The gelatin was added slowly with mixing to effect a uniform dispersion of gelatin and freedom from lumps.

The resultant gelatin solution was added to the cooled syrup. Small but effective amounts of harmless food coloring and of vanilla flavoring were added.

About 10 pounds of finely granulated sugar (6X) was sifted into the resultant marshmallow syrup as seed. The syrup was then cooled to a temperature of 140–145° F.

The syrup, in which there was present crystalline sugars, was thereupon metered into an enclosed whipping apparatus into which air was also metered, and the syrup was whipped to provide a uniform dispersion of air throughout. The whipped syrup or foam was cooled in a swept surface heat exchange to a temperature of about 100° F.

The aerated syrup was thereupon extruded through a number of dies having heart, clover, leaf, crescent and star cross-sections, onto a belt moving at a controlled speed. At the time of extrusion, the aerated syrup had a bulk density of about 42 ounces per gallon. The resultant strands were dusted with starch to provide a non-tacky surface.

When the extruded marshmallow product had a reasonably firm body, the strands were cut with a reciprocating knife to provide slices having a thickness of about ⁹⁄₁₆ inch. The resultant slices of marshmallow confectionery material were tumbled with finely granulated sugar to effect tempering and to minimize tackiness of the cut surfaces. The moisture content of the slices was about 14.6 percent, and the slices had a grained texture.

The slices were transported to the drying apparatus 11 of FIGURE 1, in which they were distributed on the upper run 17a of the conveyer belt 17 from the feed device 31. The temperature of the drying air in the drying sections 13a, 15a and 15b was maintained at 110° F., 135° F. and 145° F., respectively. Accordingly, as the slices were successively transported through the first, second and third drying sections 13a, 15a and 15b they were exposed to successively higher drying temperatures. After passing through the drying sections, they were subjected to air at ambient temperatures in the cooling section 15c, from which they were discharged at a temperature of about 90° F.

After a constant feed rate of 920 pounds per hour of slices onto the conveyer belt 17 was established, and after equilibrium conditions were reached throughout the drying apparatus 11, samples of the marshmallow confectionery material were taken at various points in the first, second and third drying sections. The samples were immediately placed in an insulated bag in which was inserted a temperature-measuring device, and their temperatures were recorded. Thereafter, the moisture content of each of the samples was determined by measuring the weight loss of the samples when held for 5 hours in a vacuum oven maintained at 100° C.

The resultant data were plotted as curve B of FIGURE 2, and represent the minimum temperatures at which marshmallow confectionery materials should be dried to economically provide a product having desirable texture and uniform moisture content throughout.

*Example II*

Using the same apparatus set forth in Example I, another marshmallow syrup was prepared from 900 pounds of granulated sugar (sucrose), 200 pounds of dextrose, and 175 pounds of water. The resultant mixture was cooked to 248° F., whereupon about 0.75 pound of sodium hexametaphosphate and about 145 pounds of corn syrup (63 DE) were added. The mixture was cooled to about 200° F.

A gelatin solution was separately prepared by adding 22 pounds of gelatin (250 Bloom) to 60 pounds of water heated to 160° F. The resultant gelatin solution was blended with the remaining materials, and about 25 pounds of finely granulated sugar (6X), as seed, and small but effective amounts of vanilla and harmless food coloring were also added.

The resultant syrup was cooled to 135–140° F., and was whipped, cooled and extruded as in Example I. At the time of extrusion, the temperature of the extruded strands was 92–96° F., and their bulk density was about 42 ounces per gallon. The strands were dusted with sugar, cut into slices, and tumbled with finely granulated sugar, as previously described.

The resultant marshmallow confectionery slices, comprising about 12.1 percent moisture and having a grained texture, were transported to the feed device 31 of the drying apparatus 11 of FIGURE 1. The temperatures of the drying air in the drying sections 13a, 15a and 15b were controlled at 119° F., 159° F. and 179° F., respectively.

After a constant feed rate of 1940 pounds per hour of the marshmallow confectionery slices onto the conveyor belt 17 was established, and after equillibrium conditions were reached throughout the drying apparatus 11, samples of the slices were taken at various points in the first, second and third drying sections, and the temperature and moisture content of each sample were obtained as set forth in Example I.

The resultant data were plotted as curve C of FIGURE 2, and represent a preferred temperature-moisture content relationship in accordance with the present invention.

*Example III*

Additional drying data were obtained using the same materials and procedures as set forth in Example II, with the exception that the temperature of the air in the third drying section 15b of the drying apparatus 11 was maintained at 200° F. Samples were again taken as in Example II, and the data obtained are plotted as curve A of FIGURE 2. As previously described, this curve represents the maximum temperature-moisture content relationship in accordance with the present invention.

Thus, there has been provided a method for reducing the moisture content of marshmallow confectionary materials to a preselected low levels. There has also been provided a marshmallow confectionery product having preselected levels of moisture.

Various of the features of the present invention are set forth in the following claims.

What is claimed is:
1. A method for reducing the moisture content of marshmallow materials comprising drying the marshmallow materials with a stream of a drying gas, said drying being controlled so that the temperature of marshmallow material is increased as its moisture content decreases and so that the marshmallow material is maintained at temperatures and moisture contents within the shaded area of FIGURE 2 for substantially the entire drying period, and removing the resultant marshmallow product from the gas stream when a desired moisture content of less than about 12 percent has been reached, said drying occurring within about six hours after preparation of the marshmallow material.

2. A method for making a marshmallow material having a preselected low moisture content comprising extruding an aerated marshmallow syrup to provide an elongated strand, cutting said strand to provide discrete marshmallow pieces, drying marshmallow pieces with a stream of a drying gas, said drying being controlled so that the temperature of marshmallow material is increased as its moisture content decreases and so that the marshmallow pieces are maintained at temperatures and moisture contents within the shaded area of FIGURE 2, and removing the resultant marshmallow pieces from the gas stream when a preselected moisture content of less than about 12 percent has been attained, said preselected moisture being attained within about six hours after said extrusion step.

3. A method for reducing the moisture content of marshmallow materials comprising drying the marshmallow material with a stream of a drying gas, said drying being controlled so that the temperature of marshmallow material is increased as its moisture content decreases and so that the marshmallow material is maintained at temperatures and moisture contents between curves B and C of the shaded area of FIGURE 2 for substantially the entire drying period, and removing the resultant marshmallow product from the gas stream when a preselected moisture content of less than about 12 percent has been attained, said preselected moisture content being attained within about six hours after preparation of the marshmallow material.

4. A method for making a marshmallow material having a preselected low moisture content comprising extruding an aerated marshmallow syrup to provide an elongated strand, cutting said strand to provide discrete marshmallow pieces, drying the marshmallow pieces with a stream of a drying gas, said drying being controlled so that the temperature of marshmallow material is increased as its moisture content decreases and so that the marshmallow material is maintained at temperatures and moisture contents between curves B and C of the shaded area of FIGURE 2, and removing the resultant marshmallow pieces from the gas stream when a preselected moisture content of less than about 12 percent has been attained, said preselected moisture content being attained within about six hours after said extrusion step.

References Cited

UNITED STATES PATENTS

| | | | |
|---|---|---|---|
| 2,847,311 | 8/1958 | Doumak et al. | 99—134 |
| 2,981,629 | 4/1961 | Ginnette et al. | 99—206 |
| 3,266,599 | 8/1966 | Osborne et al. | 99—199 |

FOREIGN PATENTS 480,911  2/1952  Canada.

A. LOUIS MONACELL, *Primary Examiner.*

RAYMOND N. JONES, *Examiner.*

S. E. HEYMAN, *Assistant Examiner.*